United States Patent
Guérin et al.

(10) Patent No.: US 11,405,564 B2
(45) Date of Patent: Aug. 2, 2022

(54) METHODS AND SYSTEMS FOR PARAMETER ALIGNMENT FOR AN IMAGE CAPTURE DEVICE WITH MULTIPLE IMAGE CAPTURE DEVICES

(71) Applicant: GoPro, Inc., San Mateo, CA (US)

(72) Inventors: Guillaume Matthieu Guérin, Chatillon (FR); Balthazar Neveu, Issy les Moulineaux (FR); Sandra Vitorino, Antony (FR)

(73) Assignee: GoPro, Inc., San Mateo, CA (US)

( * ) Notice: Subject to any disclaimer, the term of this patent is extended or adjusted under 35 U.S.C. 154(b) by 20 days.

(21) Appl. No.: 16/991,825

(22) Filed: Aug. 12, 2020

(65) Prior Publication Data

US 2021/0084237 A1 Mar. 18, 2021

Related U.S. Application Data

(60) Provisional application No. 62/901,523, filed on Sep. 17, 2019.

(51) Int. Cl.
*H04N 5/265* (2006.01)
*H04N 5/243* (2006.01)
(Continued)

(52) U.S. Cl.
CPC .............. *H04N 5/265* (2013.01); *G06T 5/50* (2013.01); *H04N 5/243* (2013.01); *H04N 5/247* (2013.01);
(Continued)

(58) Field of Classification Search
CPC ........ H04N 5/265; H04N 5/247; H04N 5/243; H04N 9/73; H04N 9/735; H04N 5/235; H04N 17/002; H04N 5/23238; G06T 5/50; G06T 2207/20221; G06T 2200/32; G06T 5/007
See application file for complete search history.

(56) References Cited

U.S. PATENT DOCUMENTS

| | | | |
|---|---|---|---|
| 9,838,614 B1 * | 12/2017 | Brailovskiy | H04N 5/265 |
| 2012/0206565 A1 * | 8/2012 | Villmer | H04N 5/2251 |
| | | | 348/36 |

(Continued)

*Primary Examiner* — Sinh Tran
*Assistant Examiner* — Zhenzhen Wu
(74) *Attorney, Agent, or Firm* — Young Basile Hanlon & MacFarlane, P.C.

(57) ABSTRACT

Methods for parameter alignment processing are described herein. An image capture device includes a first image capture device configured to capture a first image, a second image capture device configured to capture a second image, and an image signal processor connected to the first image capture device and to the second image capture device. The image signal processor is configured to apply, to the first image and the second image, at least two of a respective luminance lens shading (LLS) compensation factor, a respective color lens shading (CLS) compensation factor, a respective exposure difference compensation factor, a respective white balance compensation factor, a respective lens exposure correction (LEC) compensation factor, and a respective flare compensation factor, blend the compensated first image and the compensated second image to form a blended image, and output an image based on the blended image.

19 Claims, 11 Drawing Sheets

(51) Int. Cl.
  *H04N 5/247* (2006.01)
  *H04N 9/73* (2006.01)
  *G06T 5/50* (2006.01)

(52) U.S. Cl.
  CPC ..... *H04N 9/73* (2013.01); *G06T 2207/20221* (2013.01)

(56) References Cited

U.S. PATENT DOCUMENTS

| | | | |
|---|---|---|---|
| 2015/0249795 A1* | 9/2015 | Cho | H04N 5/3572 348/251 |
| 2016/0366386 A1* | 12/2016 | Douady-Pleven | G06T 5/50 |
| 2018/0268528 A1* | 9/2018 | Matsushita | G06T 5/50 |
| 2019/0045162 A1* | 2/2019 | Krestyannikov | H04N 9/3182 |
| 2019/0068890 A1* | 2/2019 | Kazama | H04N 5/23296 |
| 2020/0311949 A1* | 10/2020 | Okazawa | G06T 7/215 |

\* cited by examiner

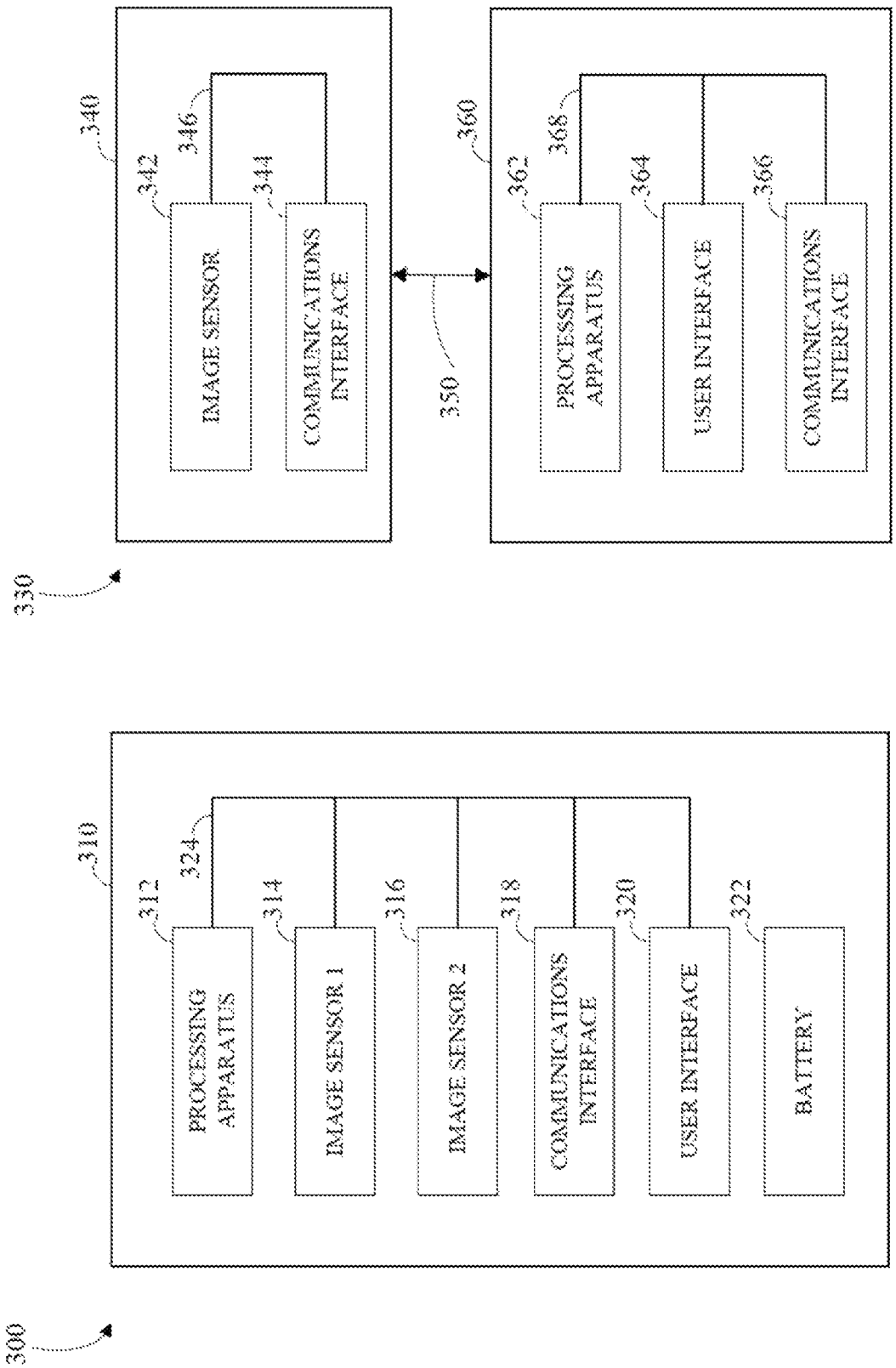

METHODS AND SYSTEMS FOR PARAMETER ALIGNMENT FOR AN IMAGE CAPTURE DEVICE WITH MULTIPLE IMAGE CAPTURE DEVICES

CROSS-REFERENCE TO RELATED APPLICATION

This application claims priority to and the benefit of U.S. Provisional Patent Application No. 62/901,523, filed Sep. 17, 2019, the entire disclosure of which is hereby incorporated by reference.

TECHNICAL FIELD

This disclosure relates to aligning images in overlap areas to reduce blend processing.

BACKGROUND

Image capture devices, such as cameras, may capture content as images or video. Light may be received and focused via a lens and may be converted to an electronic image signal by an image sensor. The image signal may be processed by an image signal processor to form an image, which may be stored and/or encoded. The configurations used by the image capture device to capture the images or video may in some cases have an effect on the overall quality of the images or video. For example, in a 360° image capture device with multiple image capture devices, each image capture device may have different characteristics which may impact the final image or video.

SUMMARY

Disclosed herein are implementations of method and systems for parameter alignment for an image capture device with multiple image capture devices. In an implementation, an image capture device includes a first image capture device configured to capture a first image, a second image capture device configured to capture a second image, an image signal processor connected to the first image capture device and to the second image capture device. The image signal processor is configured to apply, to the first image and the second image, at least two of a respective luminance lens shading (LLS) compensation factor, a respective color lens shading (CLS) compensation factor, a respective exposure difference compensation factor, a respective white balance compensation factor, a respective lens exposure correction (LEC) compensation factor, and a respective flare compensation factor, blend the compensated first image and the compensated second image to form a blended image, and output an image based on the blended image.

In an implementation, the image signal processor is further configured to apply at least three of the respective LLS compensation factor, the respective CLS compensation factor, the respective exposure difference compensation factor, the respective white balance compensation factor, the respective LEC compensation factor, and the respective flare compensation factor. In an implementation, the image signal processor is further configured to apply at least four of the respective LLS compensation factor, the respective CLS compensation factor, the respective exposure difference compensation factor, the respective white balance compensation factor, the respective LEC compensation factor, and the respective flare compensation factor. In an implementation, the image signal processor is further configured to apply at least five of the respective LLS compensation factor, the respective CLS compensation factor, the respective exposure difference compensation factor, the respective white balance compensation factor, the respective LEC compensation factor, and the respective flare compensation factor. In an implementation, the image signal processor is further configured to apply the respective LLS compensation factor, the respective CLS compensation factor, the respective exposure difference compensation factor, the respective white balance compensation factor, the respective LEC compensation factor, and the respective flare compensation factor.

In an implementation, the image signal processor is further configured to group some of the respective LLS compensation factor, the respective CLS compensation factor, the respective exposure difference compensation factor, the respective white balance compensation factor, the respective LEC compensation factor, and the respective flare compensation factor into subsets.

In an implementation, the image signal processor is further configured to group some of the respective LLS compensation factor, the respective CLS compensation factor, the respective exposure difference compensation factor, the respective white balance compensation factor, the respective LEC compensation factor, and the respective flare compensation factor into a calibration based compensation factor and a scene based compensation factor.

In an implementation, an image capture device includes a front image capture device configured to capture a first image, a rear image capture device configured to capture a second image, and at least two of a luminance lens shading (LLS) compensation factor unit, a color lens shading (CLS) compensation factor unit, an exposure difference compensation factor unit, a white balance compensation factor unit, a lens exposure correction (LEC) compensation factor unit, and a flare compensation factor unit, where appropriate ones of the LLS compensation factor unit, the CLS compensation factor unit, the exposure difference compensation factor unit, the white balance compensation factor unit, the LEC compensation factor unit, and the flare compensation factor unit are configured to determine and apply a respective LLS compensation factor, a respective CLS compensation factor, a respective exposure difference compensation factor, a respective white balance compensation factor, a respective LEC compensation factor, and a respective flare compensation factor to the first image and the second image, a blending unit configured to blend the compensated first image and the compensated second image to form a blended image, and a processing unit configured to output an image based on the blended image.

In an implementation, the image capture device includes at least three of the LLS compensation factor unit, the CLS compensation factor unit, the exposure difference compensation factor unit, the white balance compensation factor unit, the LEC compensation factor unit, and the flare compensation factor unit. In an implementation, the image capture device includes at least four of the LLS compensation factor unit, the CLS compensation factor unit, the exposure difference compensation factor unit, the white balance compensation factor unit, the LEC compensation factor unit, and the flare compensation factor unit. In an implementation, the image capture device includes at least five of the LLS compensation factor unit, the CLS compensation factor unit, the exposure difference compensation factor unit, the white balance compensation factor unit, the LEC compensation factor unit, and the flare compensation factor unit. In an implementation, the image capture device includes the LLS compensation factor unit, the CLS compensation factor unit, the exposure difference compensation factor unit, the white balance compensation factor unit, the LEC compensation factor unit, and the flare compensation factor unit.

In an implementation, the LLS compensation factor unit, the CLS compensation factor unit, the exposure difference compensation factor unit, and the white balance compensation factor are integrated to form a calibration based compensation factor unit.

In an implementation, the LEC compensation factor unit and the flare compensation factor unit are integrated to form a scene based compensation factor unit.

In an implementation, a method for parameter alignment processing includes capturing an image by a first image capture device, capturing an image by a second image capture device, applying one of calibration based compensation factors or scene based calibration factors to the image captured by the first image capture device and to the image captured by the second image capture device, respectively, applying the other of the calibration based compensation factors or the scene based calibration factors to the image captured by the first image capture device and to the image captured by the second image capture device, respectively, blending the compensated first image and the compensated second image to form a blended image, and outputting an image based on the blended image.

In an implementation, the calibration based compensation factors include at least one of luminance lens shading (LLS) compensation factors, color lens shading (CLS) compensation factors, exposure difference compensation factors, and white balance compensation factors. In an implementation, the calibration based compensation factors include at least two of luminance lens shading (LLS) compensation factors, color lens shading (CLS) compensation factors, exposure difference compensation factors, and white balance compensation factors. In an implementation, the calibration based compensation factors include at least three of luminance lens shading (LLS) compensation factors, color lens shading (CLS) compensation factors, exposure difference compensation factors, and white balance compensation factors. In an implementation, the calibration based compensation factors include at least four of luminance lens shading (LLS) compensation factors, color lens shading (CLS) compensation factors, exposure difference compensation factors, and white balance compensation factors. In an implementation, the scene based compensation factors include lens exposure correction (LEC) compensation factors and flare compensation factors.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 3A-B are block diagrams of examples of image capture systems.

DETAILED DESCRIPTION

Figure 1A:
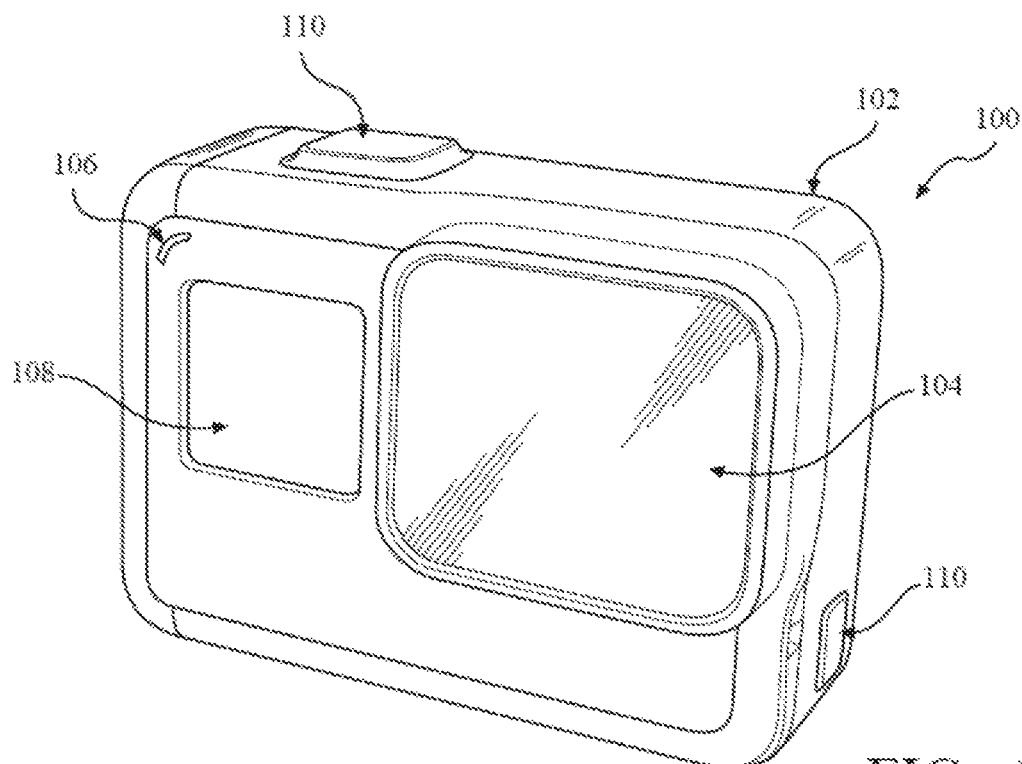
FIGS. 1A-D are isometric views of an example of an image capture device.

An image capture device may capture content as images or video. For example, in a 360° image capture device with multiple image capture devices, each image capture device may have different characteristics which may impact the final image or video. For example, the color sensitivity, lens module assembly, and the like of each image capture device may affect what color is being seen by the image capture devices. Other parameters may also not be aligned as between the two image capture devices. This impacts the level of blending complexity at the overlap areas or stitch line between the two image capture devices when configured as a 360° image capture device. That is, blending complexity increases in relation to the level of misalignment between the image capture devices. This means greater computing resources may be needed to blend the two images from the image capture devices.

Implementations of this disclosure address problems such as these using parameter alignment processing for image capture devices with multiple image sensors. The parameter alignment processing for an image capture device with multiple image capture units reduce the level of complexity of the blending algorithm, reduce the amount of required computed resources, and enable real-time blending. The implementations of this disclosure are described in detail with reference to the drawings, which are provided as examples so as to enable those skilled in the art to practice the technology. The figures and examples are not meant to limit the scope of the present disclosure to a single implementation or embodiment, and other implementations and embodiments are possible by way of interchange of, or combination with, some or all of the described or illustrated elements. Wherever convenient, the same reference numbers will be used throughout the drawings to refer to same or like parts.

FIGS. 1A-D are isometric views of an example of an image capture device 100. The image capture device 100 may include a body 102 having a lens 104 structured on a front surface of the body 102, various indicators on the front of the surface of the body 102 (such as LEDs, displays, and the like), various input mechanisms (such as buttons, switches, and touch-screen mechanisms), and electronics (e.g., imaging electronics, power electronics, etc.) internal to the body 102 for capturing images via the lens 104 and/or performing other functions. The image capture device 100 may be configured to capture images and video and to store captured images and video for subsequent display or playback.

The image capture device 100 may include various indicators, including LED lights 106 and LCD display 108. The image capture device 100 may also include buttons 110 configured to allow a user of the image capture device 100 to interact with the image capture device 100, to turn the image capture device 100 on, to operate latches or hinges associated with doors of the image capture device 100, and/or to otherwise configure the operating mode of the image capture device 100. The image capture device 100 may also include a microphone 112 configured to receive and record audio signals in conjunction with recording video.

Figure 1B:
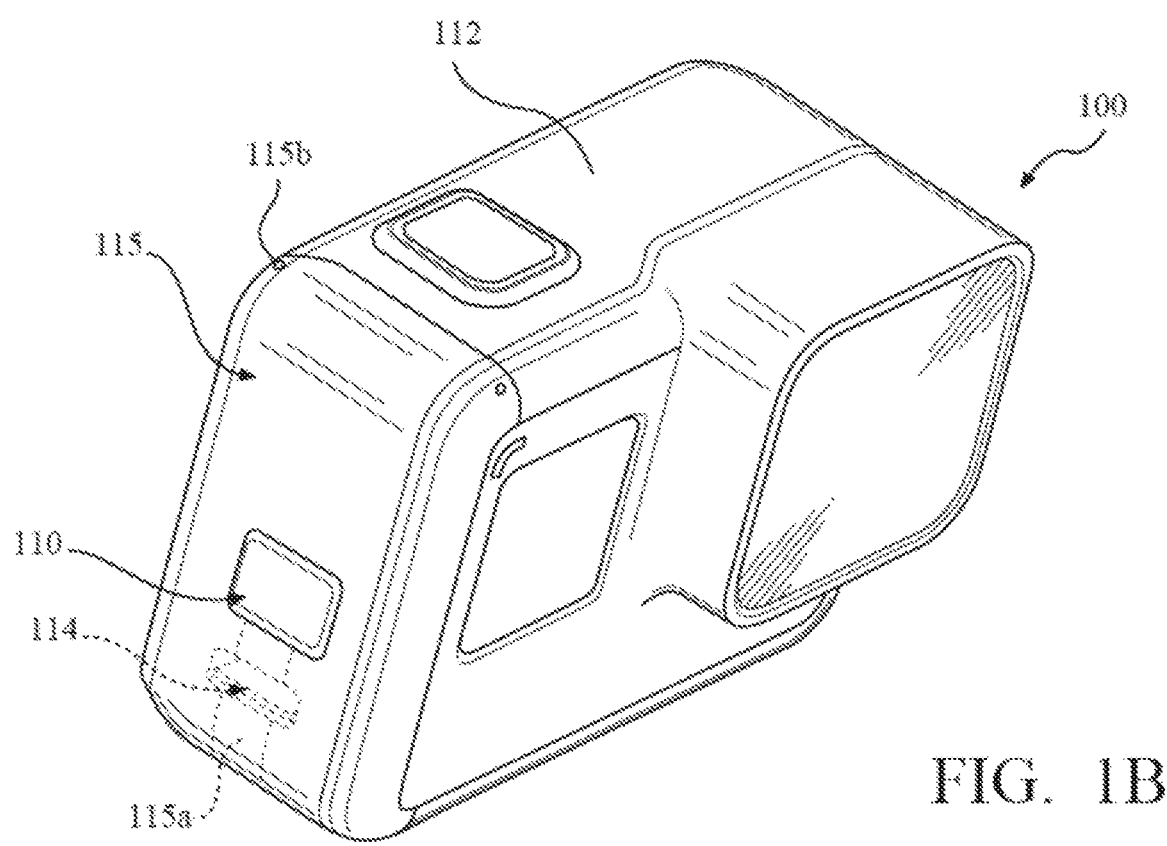
Figure 1C:
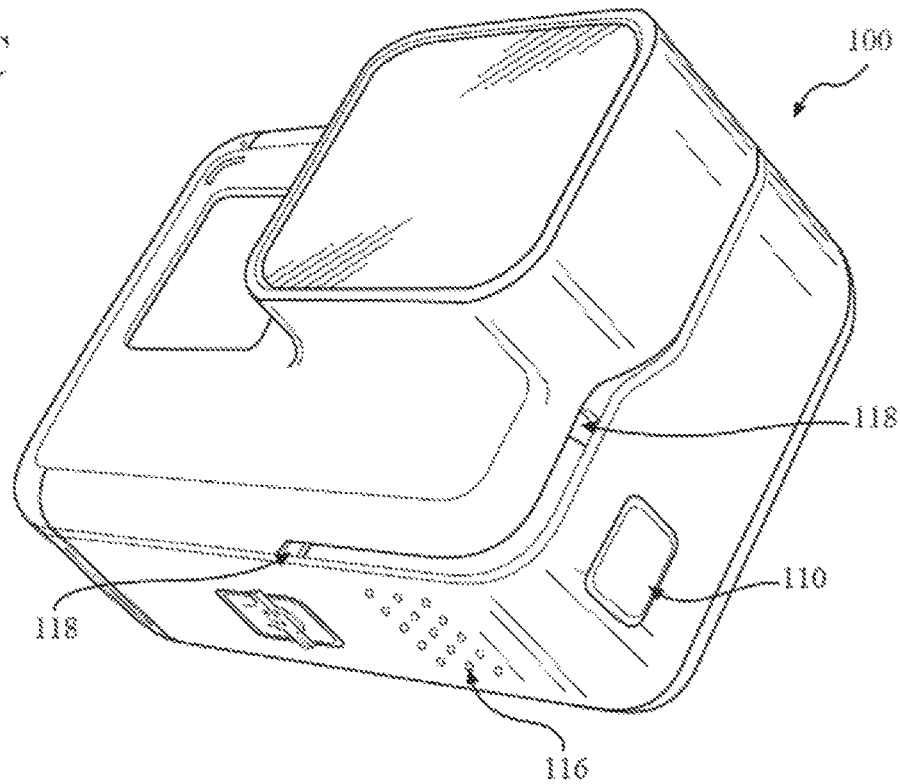
Figure 1D:
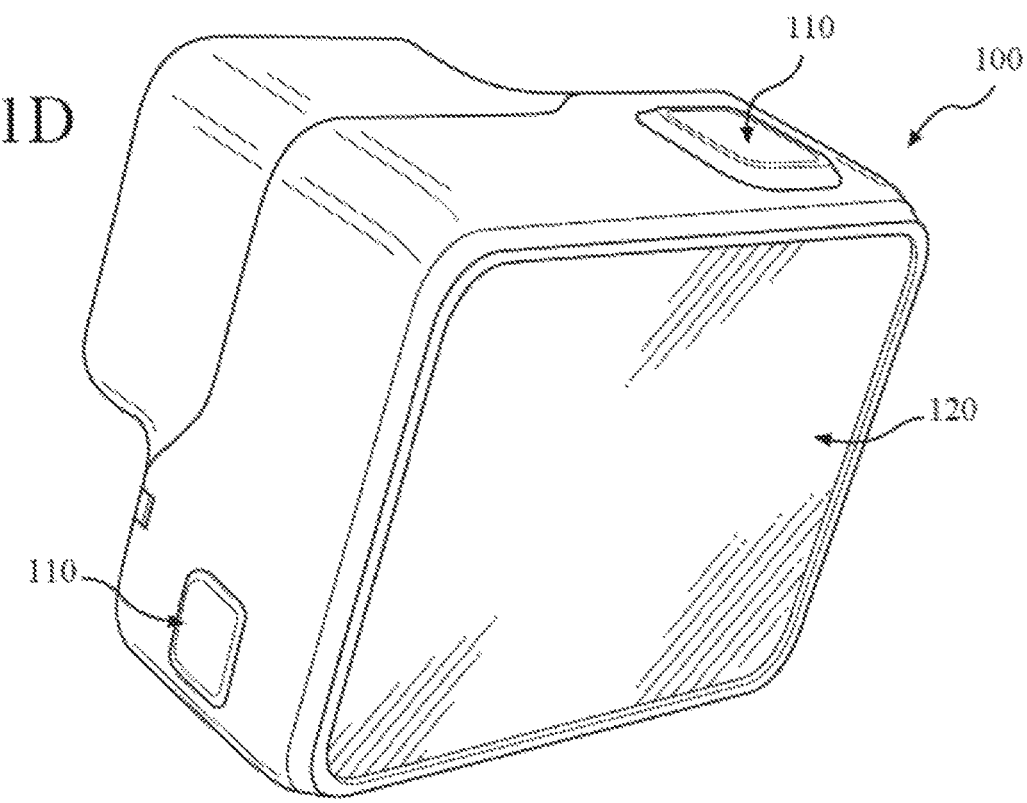

The image capture device 100 may include an I/O interface 114 (e.g., hidden as indicated using dotted lines). As best shown in FIG. 1B, the I/O interface 114 can be covered and sealed by a removable door 115 of the image capture device 100. The removable door 115 can be secured, for example, using a latch mechanism 115a (e.g., hidden as indicated using dotted lines) that is opened by engaging the associated button 110 as shown.

The removable door 115 can also be secured to the image capture device 100 using a hinge mechanism 115b, allowing the removable door 115 to pivot between an open position allowing access to the I/O interface 114 and a closed position blocking access to the I/O interface 114. The removable door 115 can also have a removed position (not shown) where the entire removable door 115 is separated from the image capture device 100, that is, where both the latch mechanism 115a and the hinge mechanism 115b allow the removable door 115 to be removed from the image capture device 100.

The image capture device 100 may also include another microphone 116 integrated into the body 102 or housing. The front surface of the image capture device 100 may include two drainage ports as part of a drainage channel 118. The image capture device 100 may include an interactive display 120 that allows for interaction with the image capture device 100 while simultaneously displaying information on a surface of the image capture device 100. As illustrated, the image capture device 100 may include the lens 104 that is configured to receive light incident upon the lens 104 and to direct received light onto an image sensor internal to the lens 104.

The image capture device 100 of FIGS. 1A-D includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes and hot shoes that can add functional features to the image capture device 100, etc.

The image capture device 100 may include various types of image sensors, such as a charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera SoC (system-on-chip), etc.), which may be included on one or more circuit boards within the body 102 of the image capture device 100.

The image capture device 100 may interface with or communicate with an external device, such as an external user interface device, via a wired or wireless computing communication link (e.g., the I/O interface 114). The user interface device may, for example, be the personal computing device 360 described below with respect to FIG. 3B. Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the user interface device (not shown) via the computing communication link, and the user interface device may store, process, display, or a combination thereof the panoramic images.

The user interface device may be a computing device, such as a smartphone, a tablet computer, a phablet, a smart watch, a portable computer, and/or another device or combination of devices configured to receive user input, communicate information with the image capture device 100 via the computing communication link, or receive user input and communicate information with the image capture device 100 via the computing communication link.

The user interface device may display, or otherwise present, content, such as images or video, acquired by the image capture device 100. For example, a display of the user interface device may be a viewport into the three-dimensional space represented by the panoramic images or video captured or created by the image capture device 100.

The user interface device may communicate information, such as metadata, to the image capture device 100. For example, the user interface device may send orientation information of the user interface device with respect to a defined coordinate system to the image capture device 100, such that the image capture device 100 may determine an orientation of the user interface device relative to the image capture device 100.

Based on the determined orientation, the image capture device 100 may identify a portion of the panoramic images or video captured by the image capture device 100 for the image capture device 100 to send to the user interface device for presentation as the viewport. In some implementations, based on the determined orientation, the image capture device 100 may determine the location of the user interface device and/or the dimensions for viewing of a portion of the panoramic images or video.

The user interface device may implement or execute one or more applications to manage or control the image capture device 100. For example, the user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the user interface device, such as via an application, may remotely control the image capture device 100 such as in response to user input.

The user interface device, such as via an application, may display unprocessed or minimally processed images or video captured by the image capture device 100 contemporaneously with capturing the images or video by the image capture device 100, such as for shot framing, which may be referred to herein as a live preview, and which may be performed in response to user input. In some implementations, the user interface device, such as via an application, may mark one or more key moments contemporaneously with capturing the images or video by the image capture device 100, such as with a tag, such as in response to user input.

The user interface device, such as via an application, may display, or otherwise present, marks or tags associated with images or video, such as in response to user input. For example, marks may be presented in a camera roll application for location review and/or playback of video highlights.

The user interface device, such as via an application, may wirelessly control camera software, hardware, or both. For example, the user interface device may include a web-based graphical interface accessible by a user for selecting a live or previously recorded video stream from the image capture device 100 for display on the user interface device.

The user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
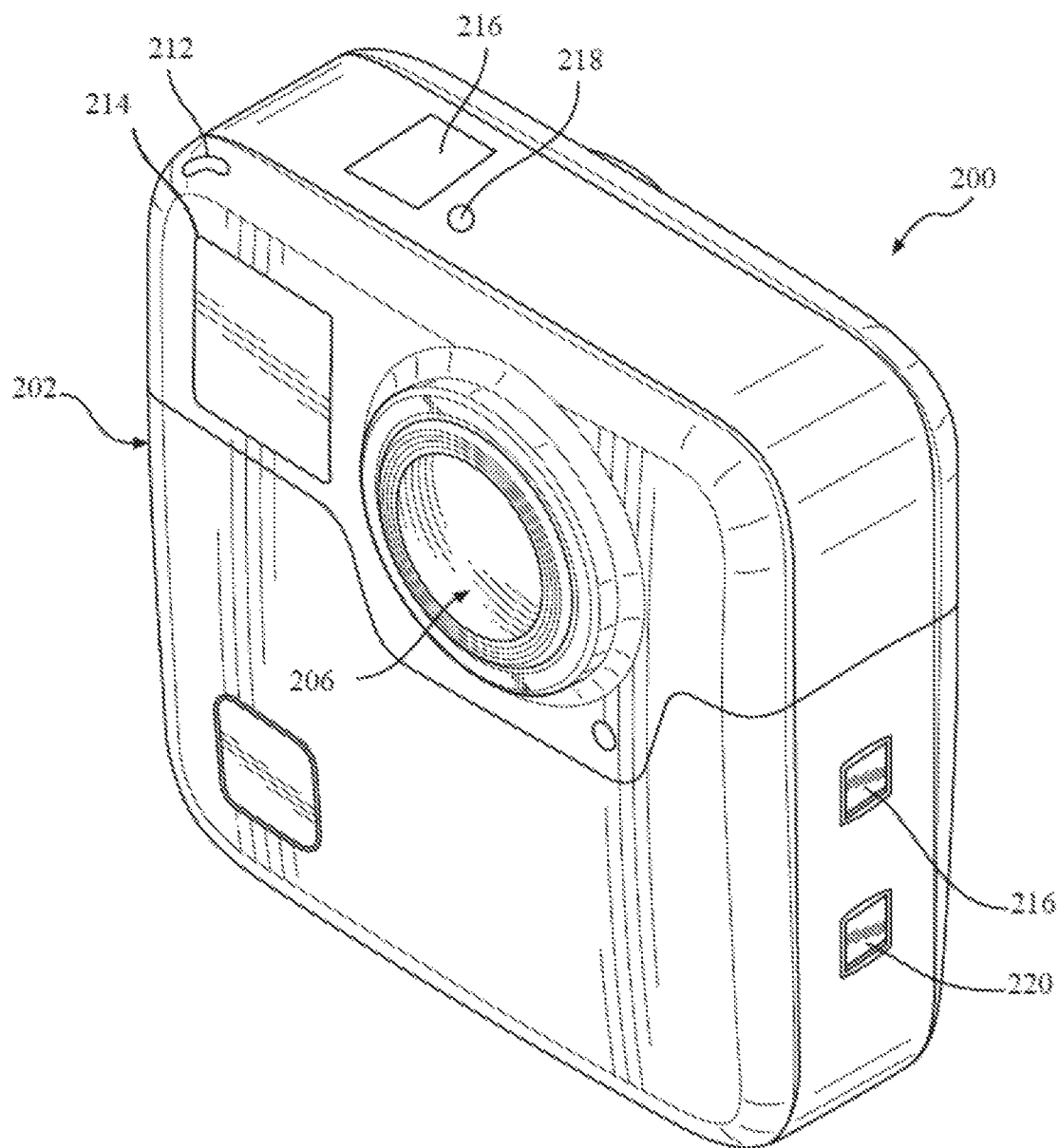
FIGS. 2A-B are isometric views of another example of an image capture device.
Figure 2B:
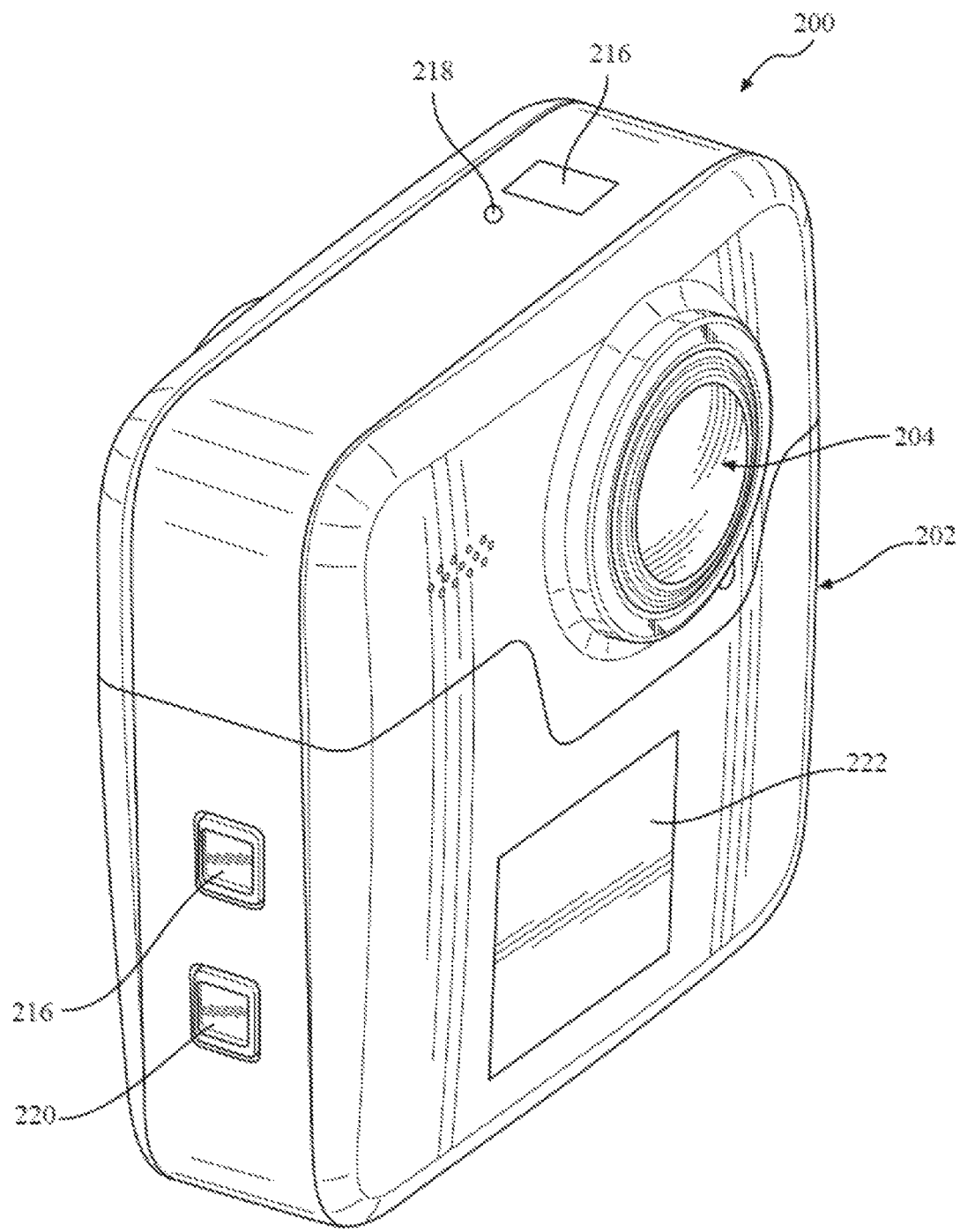

FIGS. 2A-B illustrate another example of an image capture device 200. The image capture device 200 includes a body 202 and two camera lenses 204, 206 disposed on opposing surfaces of the body 202, for example, in a back-to-back or Janus configuration.

The image capture device may include electronics (e.g., imaging electronics, power electronics, etc.) internal to the body 202 for capturing images via the lenses 204, 206 and/or performing other functions. The image capture device may include various indicators such as an LED light 212 and an LCD display 214.

The image capture device 200 may include various input mechanisms such as buttons, switches, and touchscreen mechanisms. For example, the image capture device 200 may include buttons 216 configured to allow a user of the image capture device 200 to interact with the image capture device 200, to turn the image capture device 200 on, and to otherwise configure the operating mode of the image capture device 200. In an implementation, the image capture device 200 includes a shutter button and a mode button. It should be appreciated, however, that, in alternate embodiments, the image capture device 200 may include additional buttons to support and/or control additional functionality.

The image capture device 200 may also include one or more microphones 218 configured to receive and record audio signals (e.g., voice or other audio commands) in conjunction with recording video.

The image capture device 200 may include an I/O interface 220 and an interactive display 222 that allows for interaction with the image capture device 200 while simultaneously displaying information on a surface of the image capture device 200.

The image capture device 200 may be made of a rigid material such as plastic, aluminum, steel, or fiberglass. In some embodiments, the image capture device 200 described herein includes features other than those described. For example, instead of the I/O interface 220 and the interactive display 222, the image capture device 200 may include additional interfaces or different interface features. For example, the image capture device 200 may include additional buttons or different interface features, such as interchangeable lenses, cold shoes and hot shoes that can add functional features to the image capture device 200, etc.

Figure 2C:
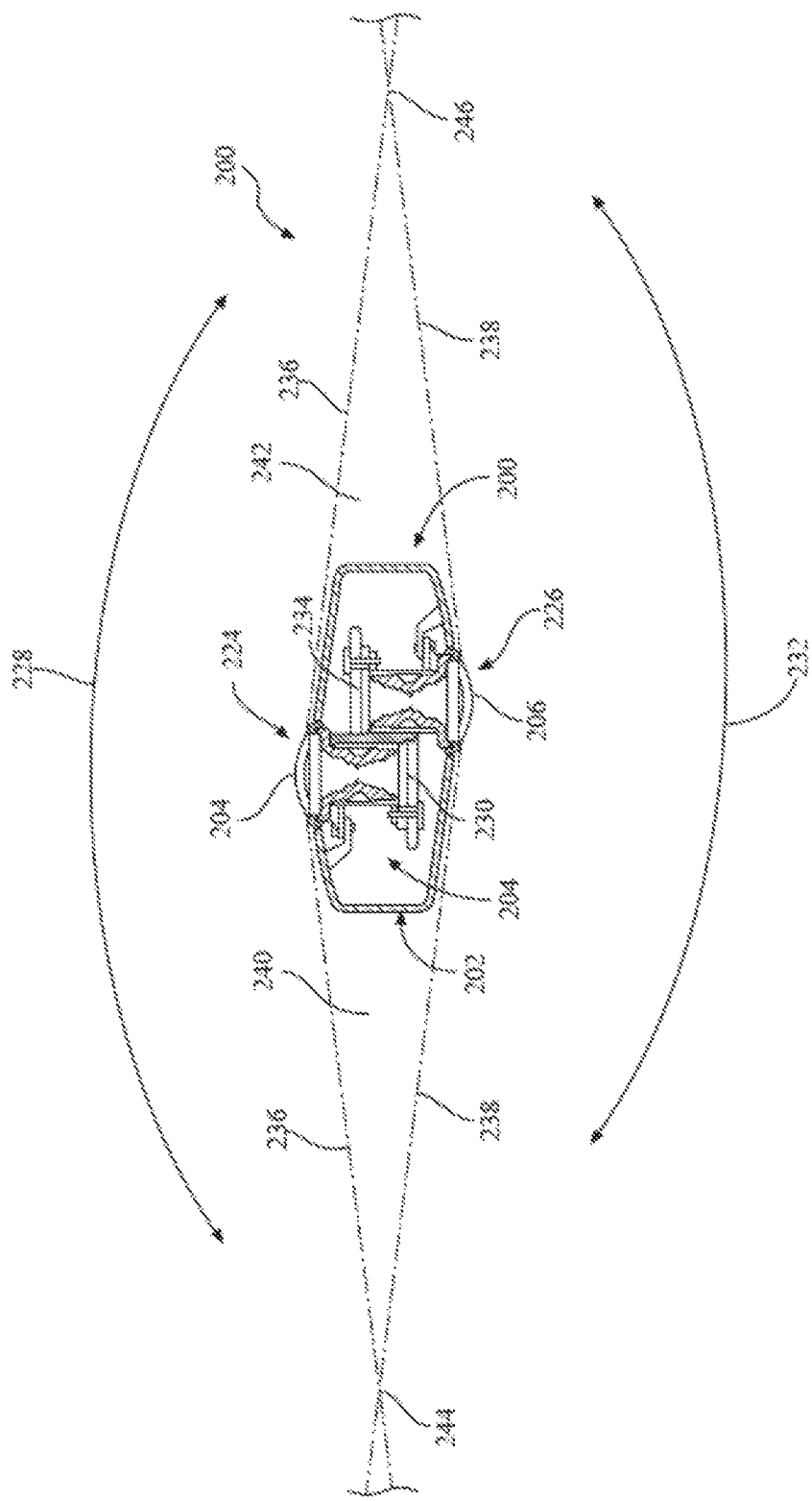
FIG. 2C is a cross-sectional view of the image capture device of FIGS. 2A-B.

FIG. 2C is a cross-sectional view of the image capture device 200 of FIGS. 2A-B. The image capture device 200 is configured to capture spherical images, and accordingly, includes a first image capture device 224 and a second image capture device 226. The first image capture device 224 defines a first field-of-view 228 as shown in FIG. 2C and includes the lens 204 that receives and directs light onto a first image sensor 230.

Similarly, the second image capture device 226 defines a second field-of-view 232 as shown in FIG. 2C and includes the lens 206 that receives and directs light onto a second image sensor 234. To facilitate the capture of spherical images, the image capture devices 224, 226 (and related components) may be arranged in a back-to-back (Janus) configuration such that the lenses 204, 206 face in generally opposite directions.

The fields-of-view 228, 232 of the lenses 204, 206 are shown above and below boundaries 236, 238, respectively. Behind the first lens 204, the first image sensor 230 may capture a first hyper-hemispherical image plane from light entering the first lens 204, and behind the second lens 206, the second image sensor 234 may capture a second hyper-hemispherical image plane from light entering the second lens 206.

One or more areas, such as blind spots 240, 242 may be outside of the fields-of-view 228, 232 of the lenses 204, 206 so as to define a "dead zone." In the dead zone, light may be obscured from the lenses 204, 206 and the corresponding image sensors 230, 234, and content in the blind spots 240, 242 may be omitted from capture. In some implementations, the image capture devices 224, 226 may be configured to minimize the blind spots 240, 242.

The fields-of-view 228, 232 may overlap. Stitch points 244, 246, proximal to the image capture device 200, at which the fields-of-view 228, 232 overlap may be referred to herein as overlap points or stitch points. Content captured by the respective lenses 204, 206, distal to the stitch points 244, 246, may overlap.

Images contemporaneously captured by the respective image sensors 230, 234 may be combined to form a combined image. Combining the respective images may include correlating the overlapping regions captured by the respective image sensors 230, 234, aligning the captured fields-of-view 228, 232, and stitching the images together to form a cohesive combined image.

A slight change in the alignment, such as position and/or tilt, of the lenses 204, 206, the image sensors 230, 234, or both, may change the relative positions of their respective fields-of-view 228, 232 and the locations of the stitch points 244, 246. A change in alignment may affect the size of the blind spots 240, 242, which may include changing the size of the blind spots 240, 242 unequally.

Incomplete or inaccurate information indicating the alignment of the image capture devices 224, 226, such as the locations of the stitch points 244, 246, may decrease the accuracy, efficiency, or both of generating a combined image. In some implementations, the image capture device 200 may maintain information indicating the location and orientation of the lenses 204, 206 and the image sensors 230, 234 such that the fields-of-view 228, 232, stitch points 244, 246, or both may be accurately determined, which may improve the accuracy, efficiency, or both of generating a combined image.

The lenses 204, 206 may be laterally offset from each other, may be off-center from a central axis of the image capture device 200, or may be laterally offset and off-center from the central axis. As compared to image capture devices with back-to-back lenses, such as lenses aligned along the same axis, image capture devices including laterally offset lenses may include substantially reduced thickness relative to the lengths of the lens barrels securing the lenses. For example, the overall thickness of the image capture device 200 may be close to the length of a single lens barrel as opposed to twice the length of a single lens barrel as in a back-to-back configuration. Reducing the lateral distance between the lenses 204, 206 may improve the overlap in the fields-of-view 228, 232.

Images or frames captured by the image capture devices 224, 226 may be combined, merged, or stitched together to produce a combined image, such as a spherical or panoramic image, which may be an equirectangular planar image. In some implementations, generating a combined image may include three-dimensional, or spatiotemporal, noise reduction (3DNR). In some implementations, pixels along the stitch boundary may be matched accurately to minimize boundary discontinuities.

FIGS. 3A-B are block diagrams of examples of image capture systems.

Referring first to FIG. 3A, an image capture system 300 is shown. The image capture system 300 includes an image capture device 310 (e.g., a camera or a drone), which may, for example, be the image capture device 200 shown in FIGS. 2A-C.

The image capture device 310 includes a processing apparatus 312 that is configured to receive a first image from a first image sensor 314 and receive a second image from a second image sensor 316. The image capture device 310 includes a communications interface 318 for transferring images to other devices. The image capture device 310 includes a user interface 320 to allow a user to control image capture functions and/or view images. The image capture device 310 includes a battery 322 for powering the image capture device 310. The components of the image capture device 310 may communicate with each other via the bus 324.

The processing apparatus 312 may be configured to perform image signal processing (e.g., filtering, tone mapping, stitching, and/or encoding) to generate output images based on image data from the image sensors 314 and 316. The processing apparatus 312 may include one or more processors having single or multiple processing cores. The processing apparatus 312 may include memory, such as a random-access memory device (RAM), flash memory, or another suitable type of storage device such as a non-transitory computer-readable memory. The memory of the processing apparatus 312 may include executable instructions and data that can be accessed by one or more processors of the processing apparatus 312.

For example, the processing apparatus 312 may include one or more dynamic random access memory (DRAM) modules, such as double data rate synchronous dynamic random-access memory (DDR SDRAM). In some implementations, the processing apparatus 312 may include a digital signal processor (DSP). In some implementations, the processing apparatus 312 may include an application specific integrated circuit (ASIC). For example, the processing apparatus 312 may include a custom image signal processor.

The first image sensor 314 and the second image sensor 316 may be configured to detect light of a certain spectrum (e.g., the visible spectrum or the infrared spectrum) and convey information constituting an image as electrical signals (e.g., analog or digital signals). For example, the image sensors 314 and 316 may include CCDs or active pixel sensors in a CMOS. The image sensors 314 and 316 may detect light incident through a respective lens (e.g., a fisheye lens). In some implementations, the image sensors 314 and 316 include digital-to-analog converters. In some implementations, the image sensors 314 and 316 are held in a fixed orientation with respective fields of view that overlap.

The communications interface 318 may enable communications with a personal computing device (e.g., a smartphone, a tablet, a laptop computer, or a desktop computer). For example, the communications interface 318 may be used to receive commands controlling image capture and processing in the image capture device 310. For example, the communications interface 318 may be used to transfer image data to a personal computing device. For example, the communications interface 318 may include a wired interface, such as a high-definition multimedia interface (HDMI), a universal serial bus (USB) interface, or a FireWire interface. For example, the communications interface 318 may include a wireless interface, such as a Bluetooth interface, a ZigBee interface, and/or a Wi-Fi interface.

The user interface 320 may include an LCD display for presenting images and/or messages to a user. For example, the user interface 320 may include a button or switch enabling a person to manually turn the image capture device 310 on and off. For example, the user interface 320 may include a shutter button for snapping pictures.

The battery 322 may power the image capture device 310 and/or its peripherals. For example, the battery 322 may be charged wirelessly or through a micro-USB interface.

Figure 6:
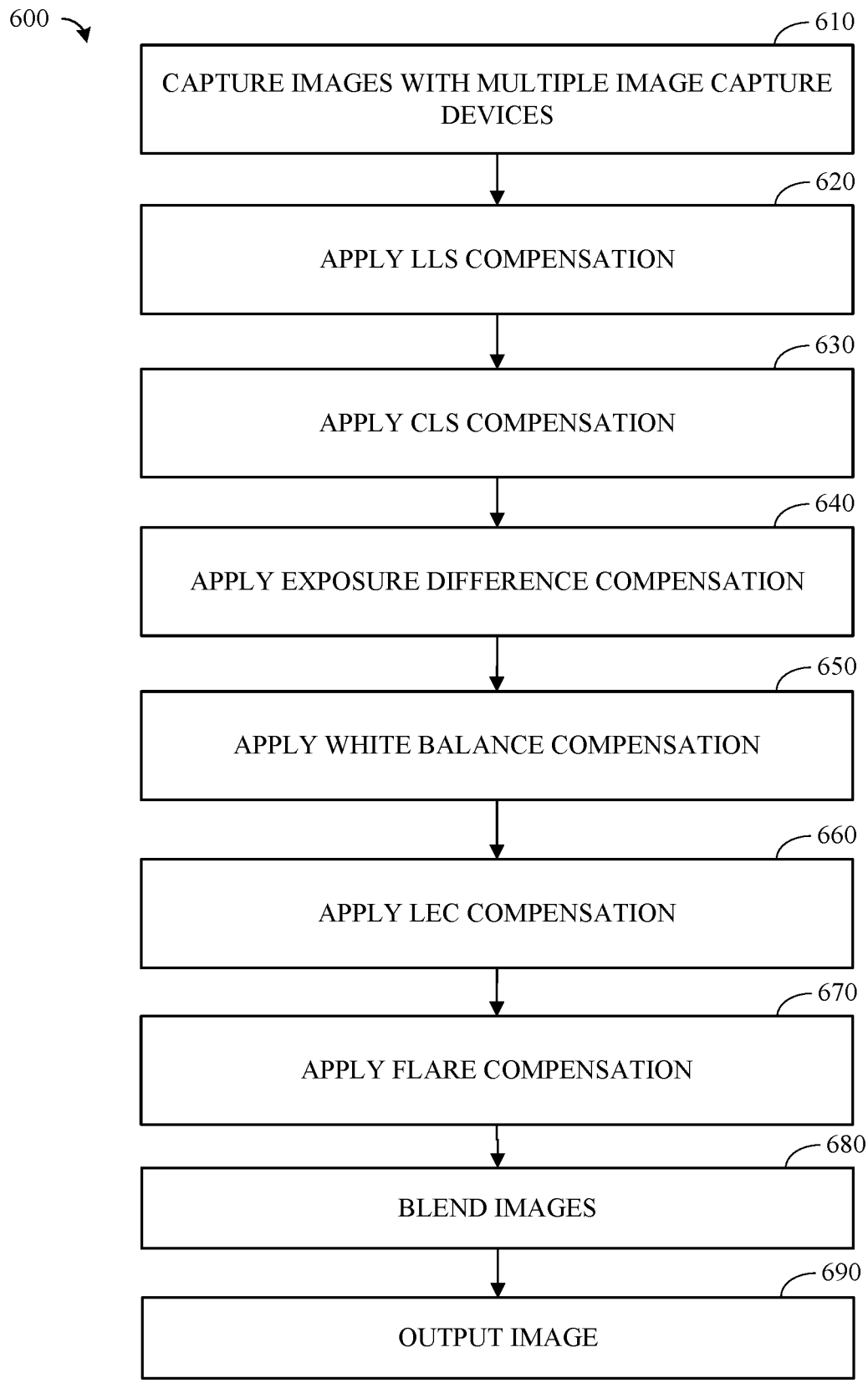
FIG. 6 is a flowchart of an example technique for parameter alignment in accordance with embodiments of this disclosure.
Figure 8:
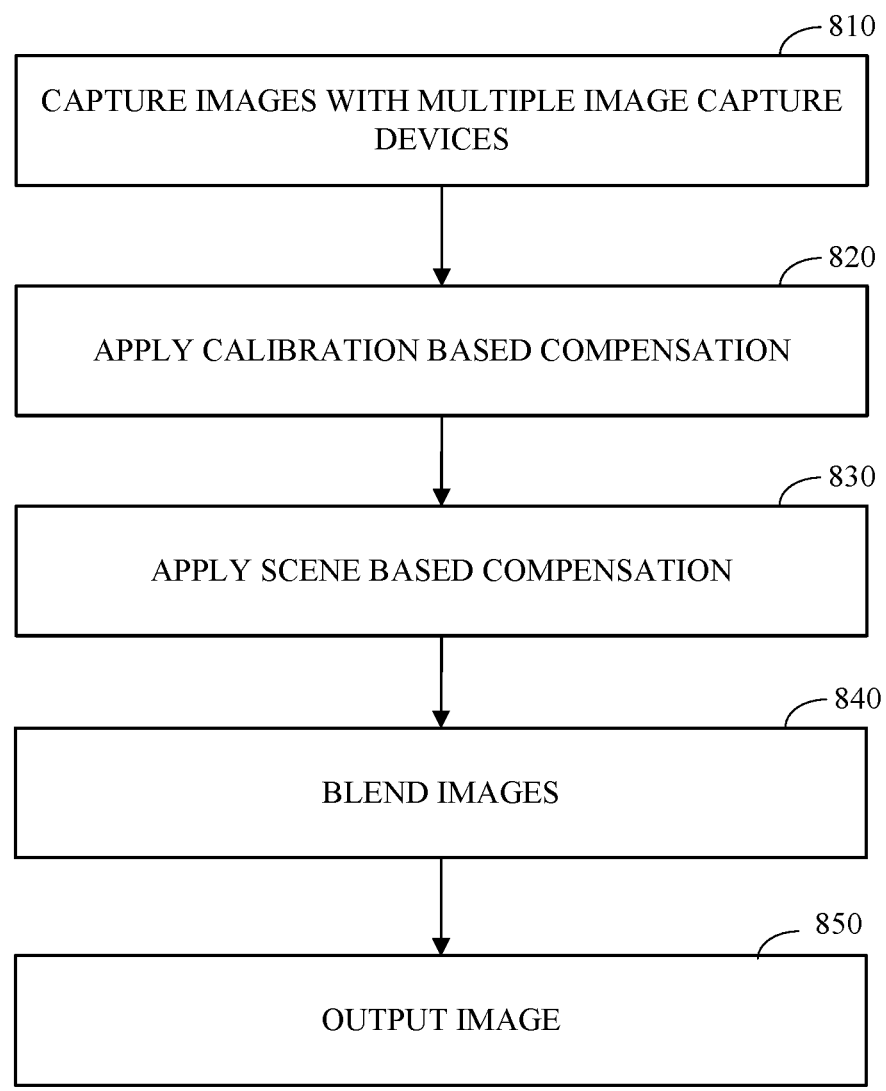
FIG. 8 is a flowchart of an example technique for parameter in accordance with embodiments of this disclosure.

The image capture system 300 may be used to implement some or all of the techniques described in this disclosure, such as the techniques described in FIGS. 6 and 8.

Referring to FIG. 3B, another image capture system 330 is shown. The image capture system 330 includes an image capture device 340 and a personal computing device 360 that communicate via a communications link 350. The image capture device 340 may, for example, be the image capture device 100 shown in FIGS. 1A-D. The personal computing device 360 may, for example, be the user interface device described with respect to FIGS. 1A-D.

The image capture device 340 includes an image sensor 342 that is configured to capture images. The image capture device 340 includes a communications interface 344 configured to transfer images via the communication link 350 to the personal computing device 360.

The personal computing device 360 includes a processing apparatus 362 that is configured to receive, using a communications interface 366, images from the image sensor 342. The processing apparatus 362 may be configured to perform image signal processing (e.g., filtering, tone mapping, stitching, and/or encoding) to generate output images based on image data from the image sensor 342.

The image sensor 342 is configured to detect light of a certain spectrum (e.g., the visible spectrum or the infrared spectrum) and convey information constituting an image as electrical signals (e.g., analog or digital signals). For example, the image sensor 342 may include CCDs or active pixel sensors in a CMOS. The image sensor 342 may detect light incident through a respective lens (e.g., a fisheye lens). In some implementations, the image sensor 342 includes digital-to-analog converters. Image signals from the image sensor 342 may be passed to other components of the image capture device 340 via a bus 346.

The communications link 350 may be a wired communications link or a wireless communications link. The communications interface 344 and the communications interface 366 may enable communications over the communications link 350. For example, the communications interface 344 and the communications interface 366 may include an HDMI port or other interface, a USB port or other interface, a FireWire interface, a Bluetooth interface, a ZigBee interface, and/or a Wi-Fi interface. For example, the communications interface 344 and the communications interface 366 may be used to transfer image data from the image capture device 340 to the personal computing device 360 for image signal processing (e.g., filtering, tone mapping, stitching, and/or encoding) to generate output images based on image data from the image sensor 342.

The processing apparatus 362 may include one or more processors having single or multiple processing cores. The processing apparatus 362 may include memory, such as RAM, flash memory, or another suitable type of storage device such as a non-transitory computer-readable memory. The memory of the processing apparatus 362 may include executable instructions and data that can be accessed by one or more processors of the processing apparatus 362. For example, the processing apparatus 362 may include one or more DRAM modules, such as DDR SDRAM.

In some implementations, the processing apparatus 362 may include a DSP. In some implementations, the processing apparatus 362 may include an integrated circuit, for example, an ASIC. For example, the processing apparatus 362 may include a custom image signal processor. The processing apparatus 362 may exchange data (e.g., image data) with other components of the personal computing device 360 via a bus 368.

The personal computing device 360 may include a user interface 364. For example, the user interface 364 may include a touchscreen display for presenting images and/or messages to a user and receiving commands from a user. For example, the user interface 364 may include a button or switch enabling a person to manually turn the personal computing device 360 on and off In some implementations, commands (e.g., start recording video, stop recording video, or capture photo) received via the user interface 364 may be passed on to the image capture device 340 via the communications link 350.

The image capture system 330 may be used to implement some or all of the techniques described in this disclosure, such as the techniques as described in FIGS. 6 and 8.

Figure 4B:
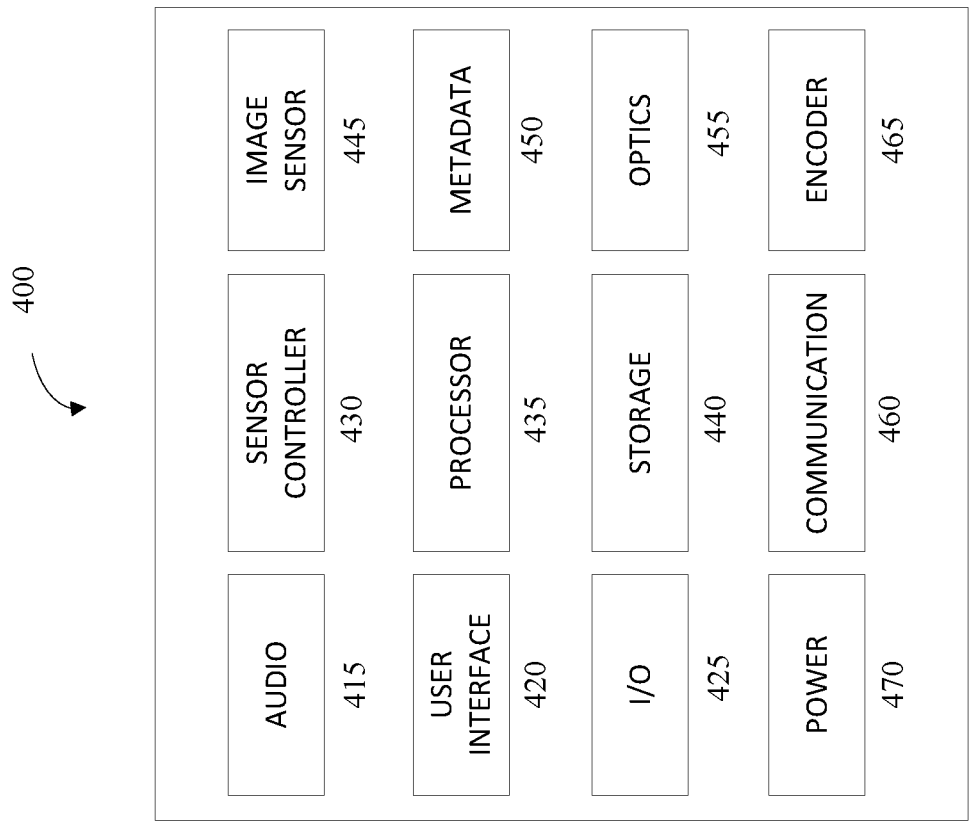
FIGS. 4A-B are a perspective view and a schematic representation of an image capture device.
Figure 4A:
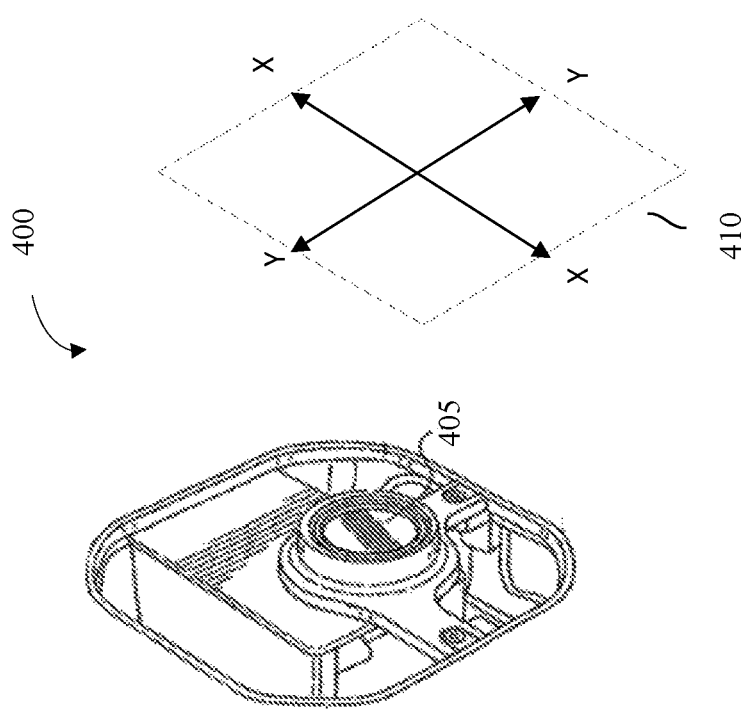

FIG. 4A is a perspective view of another example of an image capture device 400 together with an associated field-of-view and FIG. 4B is a schematic representation of the image capture device 400. The image capture device 400 includes one or more optical components or elements 405 with an associated field-of-view 410 that extends, for example, 90° in a lateral dimension X-X and 120° in a longitudinal dimension Y-Y. Dependent upon the capabilities of the particular optical component(s) 405, however, the extent of the field-of-view 410 may be varied (i.e., increased or decreased) in the lateral dimension or the longitudinal dimension. Suitable optical component(s) 405 may include one or more lenses, macro lenses, zoom lenses, special-purpose lenses, telephoto lenses, prime lenses, achromatic lenses, apochromatic lenses, process lenses, wide-angle lenses, ultra-wide-angle lenses, fisheye lenses, infrared lenses, ultraviolet lenses, spherical lenses, and perspective control lenses. In some image capture devices, multiple, overlapping fields of view are employed to increase the capability of the device, for example, by including two or more optical elements. For example, a first fisheye image may be a round or elliptical image, and may be transformed into a first rectangular image; a second fisheye image may be a round or elliptical image, and may be transformed into a second rectangular image; and the first and second rectangular images may be arranged side-by-side, which may include overlapping, and stitched together to form the equirectangular planar image.

As seen in FIG. 4A in addition to the optical component(s) 405, the image capture device 400 may further include an audio component 415, a user interface (UI) unit 420, an input/output (I/O) unit 425, a sensor controller 430, a processor 435, an electronic storage unit 440, an image sensor 445, a metadata unit 450, an optics unit 455, a communication unit 460, an encoder 465, and power system 470. Suitable examples of the image sensor 445 may include a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

During the processing of images, it is envisioned that the processor 435 may process the image data for parameter alignment. The processor 435 may implement some or all of the techniques described in this disclosure, such as the techniques for parameter alignment processing as described in FIGS. 6 and 8.

Figure 5:
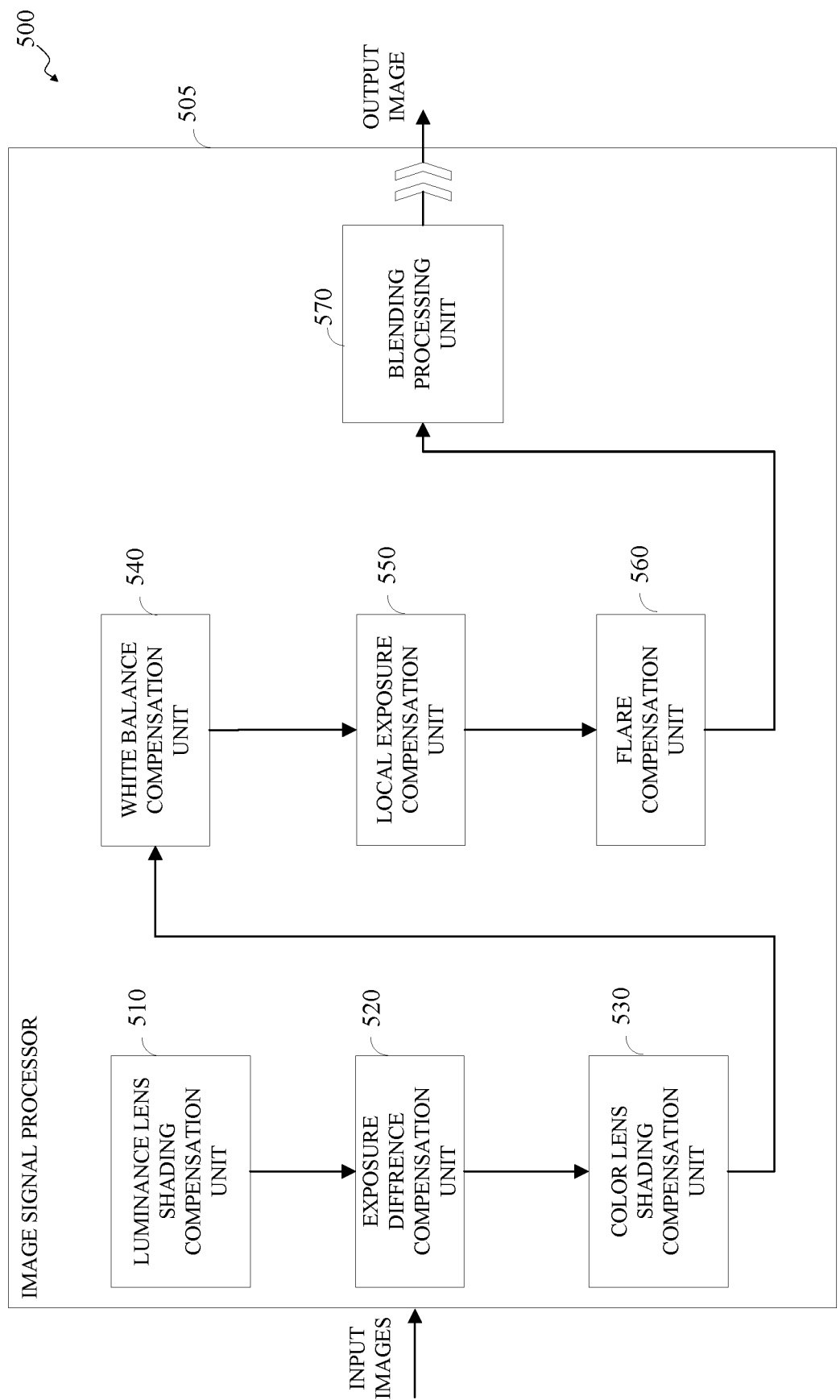
FIG. 5 is a block diagram of an example of an image processing pipeline in accordance with embodiments of this disclosure.

FIG. 5 is a block diagram of an example of an image processing pipeline 500. In some implementations, the image processing pipeline 500 may be included in an image capture device, such as the image capture device 100 shown in FIGS. 1A-D, the image capture device 200 shown in FIGS. 2A-C, the image capture device 310 shown in FIG. 3A, the image capture device 340 shown in FIG. 3B, or the image capture device 400 shown in FIGS. 4A and 4B. In some implementations, the image processing pipeline 500 may represent functionality of an integrated circuit, for example, including an image capture unit or image signal processor. In some implementations, the image processing pipeline 500 may include an image signal processor (ISP) 505.

The image signal processor 505 may receive input image signals and output an output image. For example, an image capture device (not shown), such as the first image capture device 224 and the second image capture device 226 shown in FIG. 2C, may capture an image, or a portion thereof, and may send, or transmit, the captured image, or image portion, to the image signal processor 505 as input image signals. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

The image signal processor 505 may include a luminance lens shading (LLS) compensation unit 510, which may include obtaining image statistics and data for each of the input image signals which account for differences between each of the image capture devices. A LLS compensation factor estimation and correction may be implemented using techniques known to those of skill in the art. In an implementation, images from each of image capture devices may be compared against a reference image from a reference image capture device (for example at production). A LLS compensation factor may be determined and stored in each of the image capture devices. In an implementation, one of the image capture devices may be used as the reference image capture device. In an implementation, the LLS compensation factor may be implemented using a mapping function. In an implementation, the LLS compensation factor may be implemented using a radial look-up table (LUT). Consequently, application of the LLS compensation factor to the captured image by each of the image capture devices may align the respective images.

The image signal processor 505 may include an exposure difference compensation unit 520, which may account for differences due to color sensitivity, lens module assembly, and the like. The exposure difference compensation unit 520 may use techniques known to those of skill in the art or to be developed methods and techniques to determine an exposure difference compensation factor. In an implementation, images from each of image capture devices may be compared against a reference image from a reference image capture device (for example at production). The exposure difference compensation factor may be determined and stored in each of the image capture devices. In an implementation, one of the image capture devices may be used as the reference image capture device. In an implementation, the exposure difference compensation factor may be implemented via a digital gain. Consequently, application of the exposure difference compensation factor to the captured image by each of the image capture devices may align the respective images.

The image signal processor 505 may include a color lens shading (CLS) compensation unit 530. The CLS compensation unit 530 may use techniques known to those of skill in the art or to be developed methods and techniques to determine a CLS compensation factor. In an implementation, images from each of image capture devices may be compared against a reference image from a reference image capture device (for example at production). The CLS compensation factor may be determined and stored in each of the image capture devices. In an implementation, one of the image capture devices may be used as the reference image capture device. In an implementation, the CLS compensation factor may be implemented via a per channel LUT. In an implementation, the CLS compensation factor may be implemented via a per channel mapping function. Consequently, application of the CLS compensation factor to the captured image by each of the image capture devices may align the respective images.

The image signal processor 505 may include a white balance compensation unit 540. The white balance compensation unit 540 may use techniques known to those of skill in the art or to be developed methods and techniques to determine a white balance compensation factor. In an implementation, images from each of image capture devices may be compared against a reference image from a reference image capture device (for example at production). The white balance compensation factor may be determined and stored in each of the image capture devices. In an implementation, one of the image capture devices may be used as the reference image capture device. In an implementation, the technique described in 62/901,511 may be used and is herein incorporated by reference in its entirety. In an implementation, the white balance compensation factor may be implemented via a per channel digital gain. Consequently, application of the white balance compensation factor to the captured image by each of the image capture devices may align the respective images. In implementations, auto white balance (AWB) can be performed independently, either on images before stitching or blending or after stitching or blending.

The image signal processor 505 may include a local exposure compensation (LEC) unit 550. The LEC compensation unit 550 may account for differences due to different shutter speed or gain being used in each of the image capture devices. The LEC compensation unit 550 may use techniques known to those of skill in the art or to be developed methods and techniques to determine the LEC compensation factor. In an implementation, the technique described in PCT Patent Application No. PCT/US2018/056226, filed Oct. 10, 2017, which is herein incorporated by reference in its entirety, may be used. For example, the image signal processing may include generating an exposure compensated image based on a gain value applied to the exposure level of the first image and a gain value applied to the exposure level of the second image. The gain value may progressively increase from an approximate center of the first image to the edge of the first image to a common exposure level, and the gain value may be progressively decreased from an approximate center of the second image to the edge of the second image to the common exposure level. Gain values may be scaled on each color channel for a pixel based on a saturation level of the pixel. In an implementation, the LEC compensation factor may be implemented via a radial LUT. In an implementation, the LEC compensation factor may be implemented via a mapping function. Consequently, application of the LEC compensation factor to the captured image by each of the image capture devices may align the respective images.

The image signal processor 505 may include a flare compensation unit 560. The flare compensation unit 560 may use the technique described 62/901,496, which is herein incorporated by reference in its entirety. In an implementation, a method includes receiving a first image and a second image; converting the first image from an RGB domain to a YUV domain, where Y corresponds to a luminance (Y) component; converting the second image from the RGB domain to the YUV domain, where Y corresponds to a luminance component; obtain an intensity differences profile along a stitch line between the first image and the second image, wherein the intensity differences profile is obtained for the Y component; obtain a dark corner intensity differences profile between the first image and the second image based on a relative illumination of an area outside a first image circle of the first image and a second image circle of the second image, wherein the dark corner intensity differences profile is obtained for the Y component; estimating a flare profile using the intensity differences profile and the dark corner intensity differences profile, wherein the flare profile is for the Y component; converting the flare profile to an RGB flare profile; and obtaining a processed image by modifying the first image based on RGB flare profile. In an implementation, a flare compensation factor may be implemented via a per channel offset mapping function. In an implementation, a flare compensation factor may be implemented via a per channel offset. Consequently, application of the flare compensation factor to the captured images by each of the image capture devices may align the respective images.

The order of the LLS compensation unit 510, the exposure difference compensation unit 520, the CLS compensation unit 530, the white balance compensation unit 540, the LEC compensation unit 550, and the flare compensation unit 560 in image processing pipeline 500 is illustrative. The LLS compensation unit 510, the exposure difference compensation unit 520, the CLS compensation unit 530, the white balance compensation unit 540, the LEC compensation unit 550, and the flare compensation unit 560 may be performed in any order. In an implementation, some of the LLS compensation unit 510, the exposure difference compensation unit 520, the CLS compensation unit 530, the white balance compensation unit 540, the LEC compensation unit 550, and the flare compensation unit 560 may be combined into one or more units.

In an implementation, the LLS compensation factor, the exposure difference compensation factor, the CLS compensation factor, the white balance compensation factor, the LEC compensation factor, and the flare compensation factor may be applied jointly or independently. In an implementation, two or more of the LLS compensation factor, the exposure difference compensation factor, the CLS compensation factor, the white balance compensation factor, the LEC compensation factor, and the flare compensation factor may be combined into one or more compensation transformations.

In an implementation, two or more of the LLS compensation unit 510, the exposure difference compensation unit 520, the CLS compensation unit 530, the white balance compensation unit 540, the LEC compensation unit 550, and the flare compensation unit 560 may be implemented in the image processing pipeline 500. In an implementation, three or more of the LLS compensation unit 510, the exposure difference compensation unit 520, the CLS compensation unit 530, the white balance compensation unit 540, the LEC compensation unit 550, and the flare compensation unit 560 may be implemented in the image processing pipeline 500. In an implementation, four or more of the LLS compensation unit 510, the exposure difference compensation unit 520, the CLS compensation unit 530, the white balance compensation unit 540, the LEC compensation unit 550, and the flare compensation unit 560 may be implemented in the image processing pipeline 500. In an implementation, five or more of the LLS compensation unit 510, the exposure difference compensation unit 520, the CLS compensation unit 530, the white balance compensation unit 540, the LEC compensation unit 550, and the flare compensation unit 560 may be implemented in the image processing pipeline 500.

The image signal processor 505 may include a blending unit 570 which blends the compensated images and the image signal processor 505 outputs an output image after completion of image signal processing. The blending unit 570 may use techniques known to those of skill in the art or to be developed methods and techniques. The complexity of the blending unit 570 may depend on the level of similarity between the images captured by the image capture devices. In an implementation, the greater the number of compensation factors used, the greater the alignment in the images, and the simpler the blending unit. The blending unit 570 may use simplified blending algorithms along the stitching boundary based on the application of the compensation factors described herein. In an implementation, the blending unit 570 may use linear, single scale blending algorithms as compared to multi-scale and/or nonlinear blending algorithms. In an implementation, the blending unit 570 may use a weighted average with weights based on latitude.

FIG. 6 is a flowchart of an example technique 600 for performing parameter alignment processing for an image capture device having multiple image capture devices. 1

Figure 7:
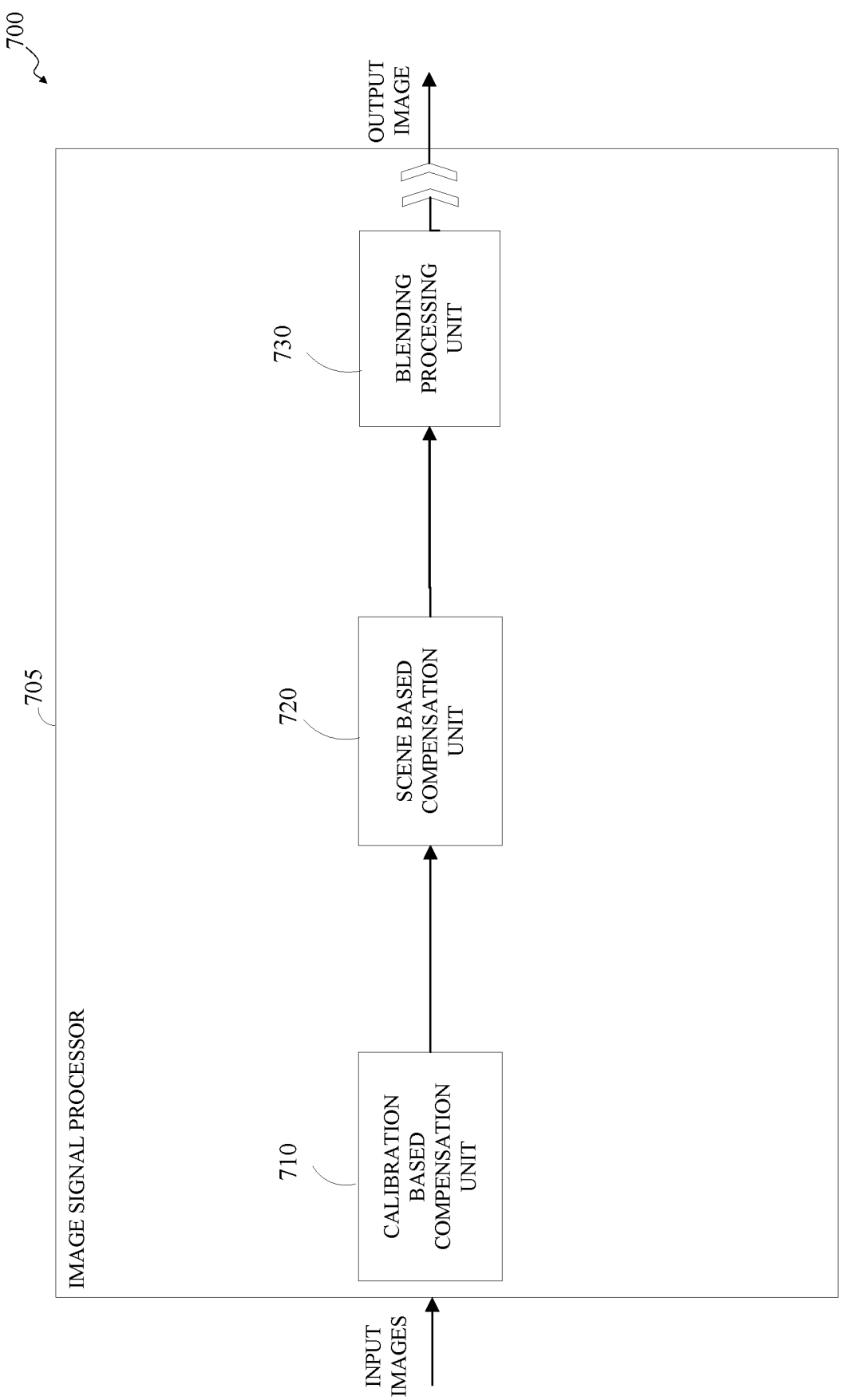
FIG. 7. is a block diagram of an example of an image processing pipeline in accordance with embodiments of this disclosure.

FIG. 7 is a block diagram of an example of an image processing pipeline 700. In some implementations, the image processing pipeline 700 may be included in an image capture device, such as the image capture device 100 shown in FIGS. 1A-D, the image capture device 200 shown in FIGS. 2A-C, the image capture device 310 shown in FIG. 3A, the image capture device 340 shown in FIG. 3B, or the image capture device 400 shown in FIGS. 4A and 4B. In some implementations, the image processing pipeline 700 may represent functionality of an integrated circuit, for example, including an image capture unit or image signal processor. In some implementations, the image processing pipeline 700 may include an image signal processor (ISP) 505.

The image signal processor 705 may receive input image signals and output an output image. For example, an image capture device (not shown), such as the first image capture device 224 and the second image capture device 226 shown in FIG. 2C, may capture an image, or a portion thereof, and may send, or transmit, the captured image, or image portion, to the image signal processor 505 as input image signals. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as twenty-four, thirty, or sixty frames per second.

The image signal processor 705 includes a calibration based compensation unit 710. The calibration based compensation unit 710 may include a LLS compensation unit, an exposure difference compensation unit, a CLS compensation unit, and a white balance compensation unit. In an implementation, the calibration based compensation unit 710 may include compensation units where a calibration factor may be determined at production and stored on the respective image capture devices. Each of the LLS compensation unit, the exposure difference compensation unit, the CLS compensation unit, and the white balance compensation unit may be implemented as described herein.

The image signal processor 705 includes a scene based compensation unit 720. The scene based compensation unit 720 may include a LEC unit and a flare compensation unit. In an implementation, the scene based compensation unit 720 may include compensation units where a calibration factor may be determined based on scene capturing settings. Each of the LEC unit and the flare compensation unit may be implemented as described herein.

The order of the calibration based compensation unit 710 and the scene based compensation unit 720 in image processing pipeline 700 is illustrative. The calibration based compensation unit 710 and the scene based compensation unit 720 may be performed in any order. Other attributes may be used to combine the compensation units described herein without departing from the scope of the claims or specification described herein.

In an implementation, the factors from the calibration based compensation unit 710 and the scene based compensation unit 720 may be applied jointly or independently.

The image signal processor 705 may include a blending unit 730 which blends the compensated images and the image signal processor 705 outputs an output image after completion of image signal processing. The blending unit 730 may use techniques known to those of skill in the art or to be developed methods and techniques. The complexity of the blending unit 730 may depend on the level of similarity between the images captured by the image capture devices.

In an implementation, the greater the number of compensation factors used, the greater the alignment in the images, and the simpler the blending unit. The blending unit 730 may use simplified blending algorithms along the stitching boundary based on the application of the compensation factors described herein. In an implementation, the blending unit 570 may use linear, single scale blending algorithms as compared to multi-scale and/or nonlinear blending algorithms. In an implementation, the blending unit 570 may use a weighted average with weights based on latitude.

FIG. 8 is a flowchart of an example technique 800 for performing parameter alignment processing for an image capture device having multiple image capture devices. The technique 800 includes: capturing 810 images with each of the multiple image capture devices in the image capture device; applying 820, for each image capture device, calibration based compensation factors to the image; applying 830, for each image capture device, scene based compensation factors to the image; blending 840 the compensated images; and outputting 850 the blended images. For example, the technique 800 may be implemented by the image capture device 100 shown in FIGS. 1A-1D, the image capture device 200 shown in FIGS. 2A-2D, the image capture device 310 shown in FIGS. 3A-3B, or the image capture device 400 of FIGS. 4A-4B. The order of compensation is illustrative and may occur in other orders or in combined steps.

The technique 800 includes capturing 810 images with each of the multiple image capture devices in the image capture device. An image capture device includes a first image capture device and a second image capture device in a 360° image capturing configuration. In an implementation, the image capture device may include a front image capture device and a rear image capture device. The first image capture device and the second image capture device each capture images which may be stitched or blended to form a spherical image.

The technique 800 includes applying 820, for each image capture device, a calibration based compensation factor to the image. For each of the first image capture device and the second image capture device, a calibration based compensation factor may be determined and compensation applied using known, to be known, or as described herein estimation and compensation techniques. Application of the calibration based compensation factor to each image captured from the first image capture device and the second image capture device aligns or substantially aligns the images and simplifies a blending operation at the stitch line.

The technique 800 includes applying 830, for each image capture device, a scene based compensation factor to the image. For each of the first image capture device and the second image capture device, a scene based compensation factor may be determined and compensation applied using known, to be known, or as described herein estimation and compensation techniques. Application of the scene based compensation factor to each image captured from the first image capture device and the second image capture device aligns or substantially aligns the images and simplifies a blending operation at the stitch line.

The technique 800 includes blending 840 the compensated images. In an implementation, the compensated images may be combined using a linear blending algorithm. In an implementation, the compensated images may be combined using a single scale blending algorithm. In an implementation, the compensated images may be combined using a linear and single blending algorithm. In an implementation, the compensated images may be combined using a blending algorithm which uses a weighted average algorithm. In an implementation, the compensated images may be combined using a blending algorithm which uses a weighted average algorithm with weights based on latitude.

The technique 800 includes storing, displaying, or transmitting 850 an output image. An output image is generated after application of the respective scales and additional image processing.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An image capture device, comprising:
   a first image capture device configured to capture a first image;
   a second image capture device configured to capture a second image;
   an image signal processor connected to the first image capture device and to the second image capture device, the image signal processor configured to:
      apply, to the first image and the second image, a respective lens exposure correction (LEC) compensation factor and at least one of a respective luminance lens shading (LLS) compensation factor, a respective color lens shading (CLS) compensation factor, a respective exposure difference compensation factor, a respective white balance compensation factor, and a respective flare compensation factor, wherein the respective LLS compensation factor is implemented using a mapping function, the respective CLS compensation factor is implemented using a per channel mapping function, the respective LEC compensation factor is implemented by a gain value increasing from a center to an edge for the first image and the gain value decreasing from a center to an edge for the second image, and the respective flare compensation factor is implemented using a per channel offset mapping function;
      blend a compensated first image and a compensated second image to form a blended image; and
      output an image based on the blended image.

2. The image capture device of claim 1, wherein the image signal processor is further configured to apply at least two of the respective LLS compensation factor, the respective CLS compensation factor, the respective exposure difference compensation factor, the respective white balance compensation factor, and the respective flare compensation factor.

3. The image capture device of claim 1, wherein the image signal processor is further configured to apply at least three of the respective LLS compensation factor, the respective CLS compensation factor, the respective exposure difference compensation factor, the respective white balance compensation factor, and the respective flare compensation factor.

4. The image capture device of claim 1, wherein the image signal processor is further configured to apply at least four of the respective LLS compensation factor, the respective CLS compensation factor, the respective exposure difference compensation factor, the respective white balance compensation factor, and the respective flare compensation factor.

5. The image capture device of claim 1, wherein the image signal processor is further configured to apply the respective LLS compensation factor, the respective CLS compensation factor, the respective exposure difference compensation factor, the respective white balance compensation factor, and the respective flare compensation factor.

6. The image capture device of claim 1, wherein the image signal processor is further configured to group the respective LLS compensation factor, the respective CLS compensation factor, the respective exposure difference compensation factor, the respective white balance compensation factor, the respective LEC compensation factor, and the respective flare compensation factor into subsets.

7. The image capture device of claim 1, wherein the image signal processor is further configured to group the respective LLS compensation factor, the respective CLS compensation factor, the respective exposure difference compensation factor, the respective white balance compensation factor, the respective LEC compensation factor, and the respective flare compensation factor into a calibration based compensation factor and a scene based compensation factor.

8. An image capture device, comprising:
a front image capture device configured to capture a first image;
a rear image capture device configured to capture a second image;
a lens exposure correction (LEC) compensation factor unit;
at least one of:
a luminance lens shading (LLS) compensation factor unit;
a color lens shading (CLS) compensation factor unit;
an exposure difference compensation factor unit;
a white balance compensation factor unit; and
a flare compensation factor unit,
wherein appropriate ones of the LLS compensation factor unit, the CLS compensation factor unit, the exposure difference compensation factor unit, the white balance compensation factor unit, the LEC compensation factor unit, and the flare compensation factor unit are configured to determine and apply a respective LLS compensation factor, a respective CLS compensation factor, a respective exposure difference compensation factor, a respective white balance compensation factor, a respective LEC compensation factor, and a respective flare compensation factor to the first image and the second image, and
wherein the respective LLS compensation factor is implemented using a radial look-up table, the respective CLS compensation factor is implemented using a per channel look-up table, the respective LEC compensation factor is implemented by a gain value increasing from a center to an edge for the first image and the gain value decreasing from a center to an edge for the second image and wherein the gain value is scaled based on a saturation level, and the respective flare compensation factor is implemented using a per channel offset;
a blending unit configured to blend a compensated first image and a compensated second image to form a blended image; and
a processing unit configured to output an image based on the blended image.

9. The image capture device of claim 8, wherein the image capture device includes at least two of the LLS compensation factor unit, the CLS compensation factor unit, the exposure difference compensation factor unit, the white balance compensation factor unit, and the flare compensation factor unit.

10. The image capture device of claim 8, wherein the image capture device includes at least three of the LLS compensation factor unit, the CLS compensation factor unit, the exposure difference compensation factor unit, the white balance compensation factor unit, and the flare compensation factor unit.

11. The image capture device of claim 8, wherein the image capture device includes at least four of the LLS compensation factor unit, the CLS compensation factor unit, the exposure difference compensation factor unit, the white balance compensation factor unit, and the flare compensation factor unit.

12. The image capture device of claim 8, wherein the image capture device includes the LLS compensation factor unit, the CLS compensation factor unit, the exposure difference compensation factor unit, the white balance compensation factor unit, and the flare compensation factor unit.

13. The image capture device of claim 8, wherein the LLS compensation factor unit, the CLS compensation factor unit, the exposure difference compensation factor unit, and the white balance compensation factor unit are integrated to form a calibration based compensation factor unit.

14. The image capture device of claim 8, wherein the LEC compensation factor unit and the flare compensation factor unit are integrated to form a scene based compensation factor unit.

15. A method for parameter alignment processing, the method comprising:
capturing an image by a first image capture device;
capturing an image by a second image capture device;
applying one of calibration based compensation factors or scene based calibration factors to the image captured by the first image capture device and to the image captured by the second image capture device, respectively;
applying the other of the calibration based compensation factors or the scene based calibration factors to the image captured by the first image capture device and to the image captured by the second image capture device, respectively;
blending a compensated first image and a compensated second image to form a blended image;
applying white balance compensation factors to the blended image; and
outputting an image based on the-a compensated blended image,
wherein the scene based calibration factors include lens exposure correction (LEC) compensation factors and flare compensation factors, wherein the LEC compensation factors are implemented using gain values which are scaled based on a saturation level and the flare compensation factors are implemented by determining a flare intensity in a YUC domain and applying a converted flare intensity in RGB domain.

16. The method of claim 15, wherein the calibration based compensation factors include at least one of luminance lens shading (LLS) compensation factors, color lens shading (CLS) compensation factors, and exposure difference compensation factors.

17. The method of claim 15, wherein the calibration based compensation factors include at least two of luminance lens shading (LLS) compensation factors, color lens shading (CLS) compensation factors, and exposure difference compensation factors.

18. The method of claim 15, wherein the calibration based compensation factors include at least luminance lens shading (LLS) compensation factors, color lens shading (CLS) compensation factors, and exposure difference compensation factors.

19. The method of claim 18, wherein the LLS compensation factors are implemented using a reference image, the CLS compensation factors are implemented using a per channel mapping function, and the exposure difference compensation factors are implemented using a digital gain.

* * * * *